Patented Apr. 24, 1951

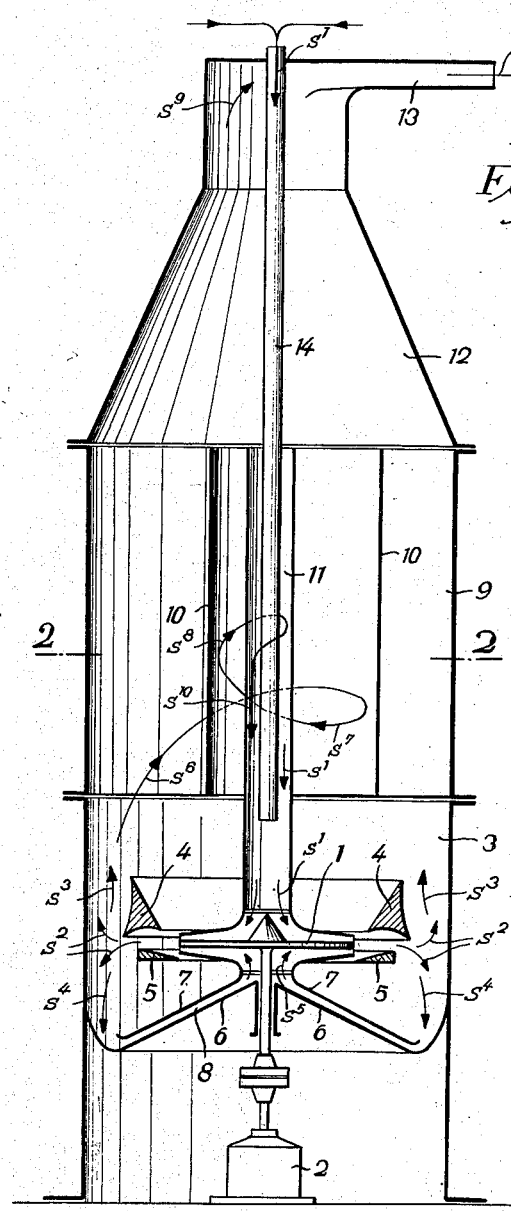

2,550,168

UNITED STATES PATENT OFFICE 2,550,168

MILL FOR THE FINE GRINDING OF GRANULAR MATERIALS

Otakar Šmíd, Ostrava-Mar. Hory, Czechoslovakia, assignor to Ostravske Chemicke Zavody, Narodni Podnik, Zavod Dusikarny, Ostrava, Czechoslovakia Application June 26, 1948, Serial No. 35,475
In Czechoslovakia June 18, 1947

3 Claims. (Cl. 241—52)

This invention relates to a mill or grinder for the fine-division of wood chips used in the manufacture of thermoplastic materials, for the fine-grinding of grain, flour, corn, salts and other granular materials.

The invention comprises in its broad aspect the charging of these materials unto the rotating wheel of a fan or a ventilator, the sucking of the charge into a rotational path created by the wheel rotation, the centrifugal throwing thereof by the wheel onto circular abrading bodies, the materials being ground by the pressure contact with these grinding bodies.

The invention will now be described more in detail and with reference to the attached drawing which illustrates a preferred embodiment thereof.

In the drawings,

Fig. 1 is a vertical sectional view of the grinder or mill, and

Fig. 2 is a horizontal sectional view on line 2—2 of Fig. 1.

The grinder or mill forming the subject matter of this invention consists essentially of the wheel 1 of a ventilator which is rotated by motor 2 at a high speed of up to 200 or more meters per second. The fan is located in the lower section 3 of a housing. A plurality of circular grinding bodies 4, 5 which may preferably have a triangular cross section are provided in superposed position and in concentric relationship to the fan wheel 1. The grinding bodies 4, 5 may be made of a suitable abrasive material, such as carborundum or they may consist of steel bodies which are outside-roughened by filling, rasping or similar methods. A collector 6 having a conical shape is located underneath fan wheel 1; the collector is partly covered by a cover 7; in this manner a conical passage 8 is created between the collector 6 and the cover 7.

A separator is provided above the fan wheel 1 in an upper section 9 of the housing. This separator consists of a spirally shaped guide member or wall 10 of which the outer end is attached to the section 9 of the housing; the inner end of this guide member transits into a vertical center tube 11 which is connected at its lower end with the fan. A second tube 14 is located within tube 11. Tube 14 extends upwardly into the upper portion of the housing which is composed of a conical portion 12 extending into a cylindrical portion and a discharge conduit 13.

The mill is operated as follows:

The materials to be fine-divided are charged in the housing 3, 9 through tube 14 in the direction of the arrows $s^1$; at the same time air or a non-explosive gas may be introduced through this tube. The materials drop through tube 14 and the lower portion of tube 11 surrounding tube 14 onto the fan wheel 1 which is rotated at high speed by motor 2; the materials are thrown by the rotation of wheel 1 onto the grinder bodies 4, 5, ground by contact with these bodies and discharged from the same in the direction of the arrows $s^2$. The more completely ground and finer portion of the charge is upwardly conducted by the air stream passing in an upward direction as indicated by the arrows $s^3$ and a less completely ground, coarser portion drops in the direction of the arrows $s^4$ onto the conical collector 6; it is sucked through passage 8 into the fan in the direction of arrows $s^5$ to be again thrown by the fan wheel 1 onto the grinder bodies 4, 5.

The completely ground portion of the charged materials is sucked and discharged from the housing through tube 13 in the direction of the arrows $s^9$. The less completely ground portion is conducted in the direction of arrows $s^6$, $s^7$, $s^8$ along the guide member 10 through opening 15 into tube 11 and is returned in the direction of arrow $s^{10}$ into the fan. In this manner the charge undergoes a continuous circulation through the fan, the grinders, the collector and the separator until it is completely ground and discharged through tube 13.

The great advantage of the above described grinder or mill is its very low power consumption, its simple construction, its high efficiency, its thorough grinding work, elimination of incomplete grinding and small wear of the grinding bodies.

I claim:

1. In a device for grinding fibrous materials and particularly wood chips, grain and flour a vertical, closed, circular chamber, a fan and a fan housing in the lower part of said chamber, said housing including two opposite vertically and peripherally spaced apart conical top and bottom members, a horizontal fan disc rotatably located in said housing, said members forming a 360° peripheral outlet for said disc and having a central opening for the admission of the fibrous materials to opposite sides of said fan disc, a vertical tube centrally extending into and through said chamber into the vicinity of the opening of said top fan member and in line therewith, to thus centrally charge the fibrous materials to be ground through said opening onto said rotatable fan disc, two annular superposed abrading bodies of a triangular shape surrounding said fan having diameters smaller than that of said chamber to thus provide an annular peripheral separation zone, said abrading bodies having their grinding faces located slightly above and below said peripheral fan outlet, said grinding faces converging in the radial exit direction of the charged materials from said fan and forming a circular grinding path therebetween into which the said materials are hurled by said fan disc and a tube at the top of said chamber for the discharge of the fines by suction.

2. In a device for grinding fibrous materials and particularly wood chips, grain and flour a vertical, closed, circular chamber, a fan and a fan housing in the lower part of said chamber, said housing including two opposite vertically and peripherally spaced apart conical top and bottom members, a horizontal fan disc rotatably located in said housing, said members forming a 360° peripheral outlet for said disc and having a central opening for the admission of the fibrous materials to opposite sides of said fan disc, a vertical tube centrally extending into and through said chamber into the vicinity of the opening of said top fan member and in line therewith, to thus centrally charge the fibrous materials to be ground through said opening onto said rotatable fan disc, two annular superposed abrading bodies of a triangular shape surrounding said fan having diameters smaller than that of said chamber to thus provide an annular peripheral separation zone, said abrading bodies having their grinding faces located slightly above and below said peripheral fan outlet, said grinding faces converging in the radial exit direction of the charged materials from said fan and forming a circular grinding path therebetween into which the said materials are hurled by said fan disc, a tube at the top of said chamber for the discharge of the fines by suction and an annular, upwardly and inwardly inclined collector funnel underneath said fan housing, centrally located with respect to said fan discs, a similarly shaped cover, spaced above the said collector funnel and connected to the center of the bottom portion of said fan housing, forming with said collector funnel an upwardly conveying annular space for the return of insufficiently ground portions of the charge into said rotatable fan containing housing.

3. In a device according to claim 2, a vertical tube attached at the lower end to the upper opening of said fan housing and surrounding with its upper open portion said vertical charging tube and a spiral-shaped vertical guide wall located above said fan housing and transiting into said vertical tube.

OTAKAR ŠMÍD.

REFERENCES CITED

The following references are of record in the file of this patent:

UNITED STATES PATENTS

| Number | Name | Date |
|---|---|---|
| 277,790 | Saint Requier | May 15, 1883 |
| 617,345 | Mitchell | Jan. 10, 1899 |
| 832,801 | Millross | Oct. 9, 1906 |
| 1,444,585 | Collins | Feb. 6, 1923 |
| 1,697,704 | Wood | Jan. 1, 1929 |
| 1,724,041 | Plaisted | Aug. 13, 1929 |
| 1,771,321 | Snow | July 22, 1930 |
| 1,835,886 | Lykken | Dec. 8, 1931 |
| 1,875,817 | London | Sept. 6, 1932 |
| 1,955,960 | Hirsch | Apr. 24, 1934 |
| 2,159,200 | Bleibtreu | May 23, 1939 |
| 2,199,015 | Toensfeldt | Apr. 30, 1940 |
| 2,290,379 | Peterson | July 21, 1942 |
| 2,304,264 | Lykken | Dec. 8, 1942 |
| 2,324,018 | Peterson | July 13, 1943 |
| 2,434,037 | Ebersole | Jan. 6, 1948 |

FOREIGN PATENTS

| Number | Country | Date |
|---|---|---|
| 110,006 | Australia | June 25, 1928 |
| 443,372 | France | July 12, 1912 |
| 8,605 | Great Britain | of 1890 |